United States Patent [19]
Joerg et al.

[11] Patent Number: 5,644,967
[45] Date of Patent: Jul. 8, 1997

[54] SERVO VALVE ARRANGEMENT

[75] Inventors: Wolfgang Joerg, Stuttgart; Jaromir Bordovsky, Berglen; Aydogan Cakmaz, Stuttgart; Hubert Heck, Duesseldorf; Arno Roehringer, Ditzingen; Claus Gall, Fellbach; Reinhold Abt, Neuhausen; Rainer Strauss, Kaarst; Karl-Hans Koehler, Wernau, all of Germany

[73] Assignee: Mercedes-Benz AG, Stuttgart, Germany

[21] Appl. No.: 495,993

[22] Filed: Jun. 28, 1995

[30] Foreign Application Priority Data

Jun. 28, 1994 [DE] Germany .............. 44 22 553.9

[51] Int. Cl.⁶ ........................................ F15B 11/08
[52] U.S. Cl. ...................... 91/457; 91/464; 91/465
[58] Field of Search .......................... 91/457, 462, 464, 91/465, 446, 455, 521

[56] References Cited

U.S. PATENT DOCUMENTS

| | | | |
|---|---|---|---|
| 3,613,508 | 10/1971 | Krehbiel | 91/464 X |
| 3,922,953 | 12/1975 | Strauff | 91/465 X |
| 3,927,604 | 12/1975 | Jablonsky | 91/465 X |
| 4,523,513 | 6/1985 | Gudat et al. | 91/464 X |
| 4,699,231 | 10/1987 | Lang et al. | |
| 5,036,750 | 8/1991 | Katayama | 91/464 |
| 5,058,484 | 10/1991 | Kuttruf | 91/464 X |
| 5,437,216 | 8/1995 | Chapman | 91/446 |
| 5,476,119 | 12/1995 | Herrmann | 91/455 X |

FOREIGN PATENT DOCUMENTS

| | | |
|---|---|---|
| 1155146 | 6/1969 | United Kingdom . |
| 1249264 | 10/1971 | United Kingdom . |
| 1251315 | 10/1971 | United Kingdom . |
| 1413111 | 11/1975 | United Kingdom . |
| WO 93/02904 | 2/1993 | WIPO . |

*Primary Examiner*—Hoang Nguyen
*Attorney, Agent, or Firm*—Evenson, McKeown, Edwards & Lenahan, P.L.L.C.

[57] ABSTRACT

A servo valve arrangement with a high-pressure, low-pressure and motor connection and with a pressure control valve arranged between the high-pressure connection and motor connection and a return control valve arranged between the motor connection and low-pressure connection is provided. The pressure control valve normally is closed and the return control valve normally is open. The pressure control valve can be opened by a common actuating member whilst closing the return control valve. The valve arrangement is suitable, in particular, for hydraulic power steering systems of motor vehicles with a so-called closed center.

10 Claims, 7 Drawing Sheets

SERVO VALVE ARRANGEMENT

BACKGROUND AND SUMMARY OF THE INVENTION

The invention relates to a servo valve arrangement with a high-pressure, low-pressure and motor connection and with a pressure control valve arranged between the high-pressure connection and motor connection and a return control valve arranged between the motor connection and low-pressure connection. The pressure control valve normally is closed and the return control valve normally is open. Both valves have axially displaceable control parts which are arranged equiaxially with respect to one another and can be actuated by a common actuating member, in particular a ram, while closing the return control valve and opening the pressure control valve.

In the case of conventional hydraulic power steering systems currently used in motor vehicles, a hydraulic medium flows virtually constantly through the associated servo valve arrangement. This is true specifically even when no servo force is required at all such as, for example, in normal straight-ahead travel. The servo valve arrangement consists in principle of two parallel throttle routes which are arranged between a pressure connection and a low-pressure connection. Each comprise two throttles which are controlled in opposite directions, are arranged in series, and between which a motor connection branches off in each case. Depending on the direction and magnitude of an actuating moment to be applied at the steering wheel, the input-side throttle of the one throttle route is increasingly opened and, at the same time, the output throttle is increasingly throttled, while the throttles of the other throttle route are controlled in the opposite direction in each case. In this manner, a pressure difference which can be controlled according to direction and magnitude is generated between the motor connections of the two throttle routes, such that an appropriate servomotor generates a controllable servo force in one direction or the other. For operating states in which no servo force is required, all the throttles assume a central position 80 that the medium flows evenly through both throttle routes and there is pressure equilibrium between the motor connections.

Since, in these known power steering systems, a constant hydraulic flow must be maintained, power is required constantly.

In terms of a reduction in the power requirement of motor vehicles, it is basically known to provide power steering systems with a so-called "closed center", i.e. as long as no servo force is required, the servomotor has no connection at all to the pressure source. In contrast, in this state the servomotor is only connected to the low pressure connection or hydraulic reservoir in order to allow passive mobility of the servomotor.

In this context, attempts have already been made to implement power steering systems using the servo valve arrangements specified above. Essentially, two servo valve arrangements of the type specified above then have to be arranged parallel to one another between a pressure source or a pressure accumulator and a hydraulic reservoir. Depending on the actuating moment to be applied at the steering wheel, the pressure control valve of one servo valve arrangement or the other is then opened to a greater or lesser extent. This is so that in each case the motor connection of the one servo valve arrangement or the other is connected with a controllable throttle resistance to the pressure source or the pressure accumulator and, at the same time, is blocked off relative to the low-pressure connection. The servomotor connected between the motor connections of the two servo valve arrangements thus generates a servo force in one direction or the other.

There is therefore needed a servo valve arrangement which guarantees particularly good control characteristics.

These needs are met according to the present invention by designing the pressure control valve as a seat valve.

In this manner, it is guaranteed that the closed state of the pressure control valve is combined with a precisely reproducible position of the associated control part, and any adjustment of the control part immediately entails a controlled opening of the pressure control valve. Seat-controlled valves are otherwise distinguished by the fact that they close virtually without leakage.

According to a first embodiment of the present invention, the control parts of the pressure and return control valve can be arranged as parts of a common valve piston. In this manner, the return control valve only allows a throttled connection between the motor connection and the low-pressure connection when the pressure control valve is closed. It is thus guaranteed, on the one hand, that the return control valve closes quickly when the pressure control valve opens. On the other hand, the return control valve can act in the open state in the sense of damping movements of the servomotor.

According to a particularly preferred alternative embodiment of the invention, the control part of the return control valve is made to be displaceable to a limited extent relative to the control part of the pressure control valve and to be coupled thereto in terms of drive. This is done in such a manner that the pressure control valve only opens after the return control valve has closed. In this way, for virtually all operating states, it can be guaranteed that the pressure connection and low-pressure connection remain separated from one another and that virtually no hydraulic power losses whatsoever occur.

Other objects, advantages and novel features of the present invention will become apparent from the following detailed description of the invention when considered in conjunction with the accompanying drawings.

DETAILED DESCRIPTION OF THE DRAWINGS

Figure 1:
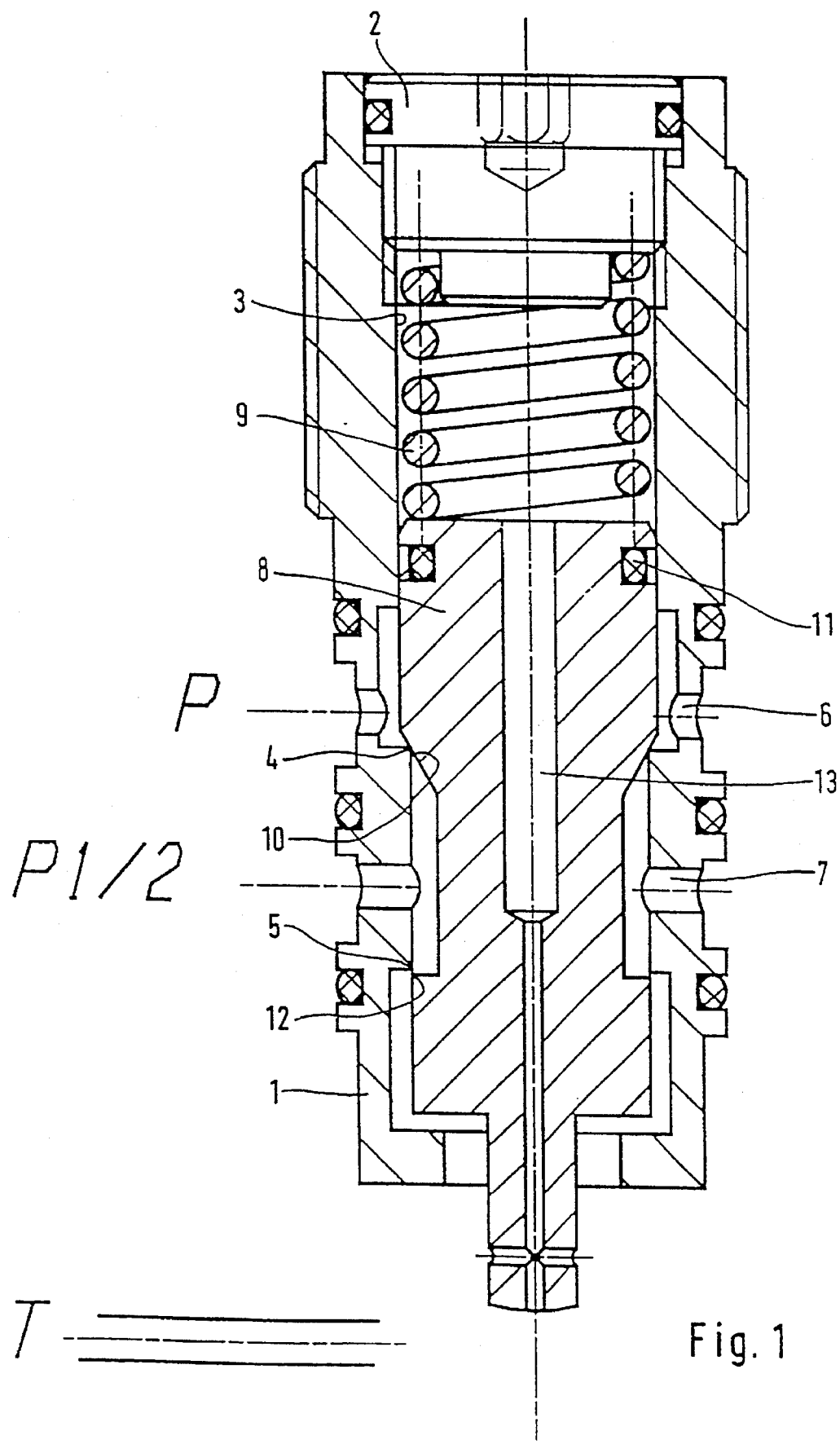
FIG. 1 is a cross-sectional view taken in an axial direction of a first embodiment of the servo valve according to the present invention.

In the embodiment illustrated in FIG. 1, an essentially cylindrical valve cartridge 1 has an axial bore 3 which is closed at one end face by a screwed-in base part 2 and is widened and constricted several times along its axial length in an annularly stepped manner. A reduced diameter section is formed between two sections of enlarged diameter forming two annular edges 4 and 5. The size of the reduced diameter section is smaller than the diameter of the region of the axial bore 3 adjoining the bottom part 2. Radial bores 6 are arranged axially above the annular edge 4 in the valve cartridge 1. The radial bores 6 communicate with a pressure connection P (not illustrated). Radial bores 7 are located axially between the annular edges 4 and 5. The radial bores 7 communicate with a motor connection P1 or P2 (not illustrated). The region of the axial bore 3 remaining axially below the annular edge 5 communicates via the lower end-face opening of the valve cartridge 1 with a low-pressure connection T.

A valve piston 8 is displaceably guided to slide inside the axial bore 3 of the valve cartridge 1. The valve piston 8 is forced into the normal position illustrated in FIG. 1 via a helical compression spring 9 which is tensioned between the base part 2 and the end face of the valve piston 8 at the top in FIG. 1. In this position, the valve piston 8, with a conical section 10 formed on it, is seated tightly on the annular edge 4.

With its upper section adjoining the conical section 10 at the top, the valve piston 8 is provided with a sealing ring 11 in the upper part of the axial bore 3 above the radial bores 6. In this manner, the part of the axial bore 3 receiving the helical compression spring 9 remains shut off from the radial bores 6 of the pressure connection P.

A narrowed region of the valve piston 8 adjoins the conical section 10 at the bottom so that an annular space remains in the region of the radial bores 7 of the motor connection P1 or P2 inside the valve cartridge 1. The annular space is bounded at the bottom by an annular edge 12 which is formed on the valve piston 8 and interacts with the annular edge 5 of the valve cartridge 1, as is illustrated further below. The section of the valve piston 8 adjoining the annular edge 12 at the bottom is dimensioned such that it can be pushed into the section of the axial bore 3 between the annular edges 4 and 5. Correspondingly, an annular space which communicates with the low-pressure connection T remains between the valve piston 8 and the wall of the lower section of the axial bore 3.

The valve piston 8 otherwise has an axial bore which communicates with the low-pressure connection T such that the space between the valve piston 8 and the base part 2 constantly has low pressure.

In the normal position of the valve piston 8 illustrated, a narrow annular gap remains between the annular edges 5 and 12. Through this gap, the motor connection P1 or P2 constantly communicates with the low pressure connection T. If the valve piston 8 is raised by pressure on its ram-like lower end counter to the force of the helical compression spring 9, the annular gap is increasingly narrowed and subsequently closed as soon as the annular edge 12 of the valve piston 8 is moved in an upward direction beyond the annular edge 5 of the axial bore 3. At the same time, the conical section 10 of the valve piston 8 is lifted from the annular edge 4. The motor connection P1 or P2 is thus separated from the low pressure connection T on the one hand, and connected to the pressure connection P on the other hand. Correspondingly, pressure medium then flows to the servomotor (not illustrated). As soon as the valve piston 8 again moves into the normal position illustrated, the motor connection P1 or P2 is separated from the pressure connection P and again brought into connection with the low-pressure connection T.

Corresponding to the stroke movements of the valve piston 8, hydraulic medium is introduced via an axial bore 13 of the piston valve 8 from the low-pressure connection T into the space between the base part 2 and the piston valve 8 or is forced out of the space. If the axial bore 13 is designed, as illustrated, as a throttle small diameter bore, the hydraulic medium flowing through the axial bore 13 has to overcome a specific throttle resistance, such that the stroke movements of the valve piston 8 are hydraulically damped.

In the case of a power steering system for a motor vehicle, two valve cartridges 1 are arranged parallel to one another, the valve piston 8 of one valve cartridge 1 or the other is lifted out of its normal position depending on the direction of the torque to be applied manually, such that either the connection P1 or the connection P2 of the servomotor is separated from the low-pressure connection T and is connected to the pressure connection P. Thus, the servo motor generates a servo force in one direction or the other.

Figure 2:
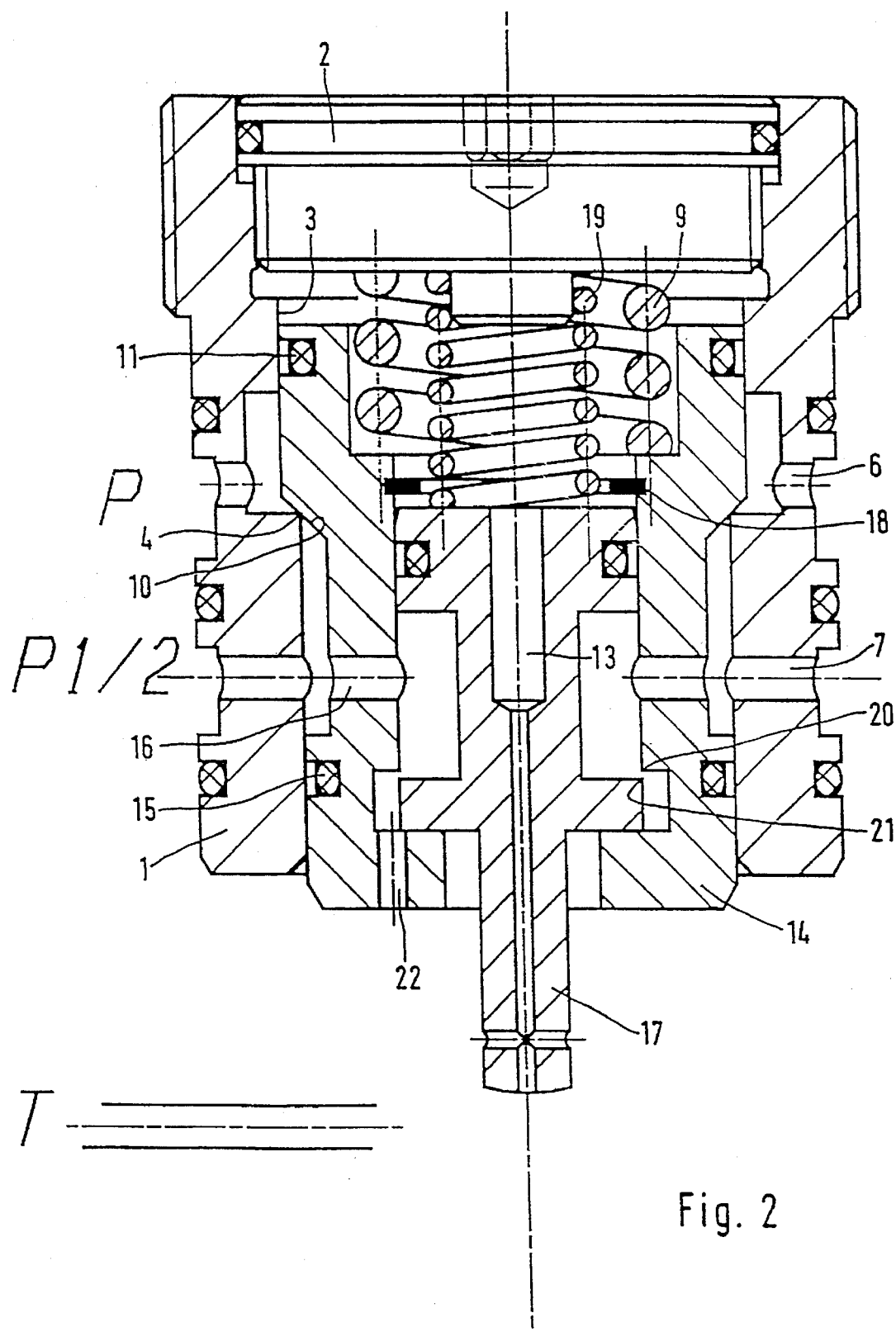
FIG. 2 is a cross-sectional view taken in an axial direction of a second embodiment of the servo valve according to the present invention.

In the embodiment illustrated in FIG. 2, a valve sleeve 14 is guided so as to be displaceable inside the axial bore 3 of the valve cartridge 1. The valve sleeve 14 is seated in the normal position with the conical section 10 on the annular edge 4 of the axial bore 3 and is preferably provided with sealing rings 11 and 15 axially above the radial bores 6 and axially below the radial bores 7 of the valve cartridge 1. This is done such that the annular spaces remaining between the wall of the axial bore 3 and the valve sleeve 14 in the region of the radial bores 6 and 7 are sealed off at the top and bottom. The valve sleeve 14 is normally pressed by the helical compression spring 9 with the conical section 10 against the annular edge 4 of the valve cartridge 1 so that the radial bores 6 and 7 are separated from one another.

Arranged in the valve sleeve 14 are radial bores 16 which constantly communicate with the radial bores 7 and connect the interior of the valve sleeve 14 to the radial bores 7.

A valve slide piston 17 is arranged so as to be axially displaceable to a limited extent inside the valve sleeve 14. The possible displacement path is bounded by a stop ring 18 arranged in the valve sleeve 14 and a lower annular rim on the valve sleeve 14.

The valve slide piston 17 is tensioned in the downward direction by means of a helical compression spring 19 whose upper end is supported on the base part 2 of the valve cartridge 1, such that the valve slide piston 17 attempts to assume the lower end position illustrated in FIG. 2 in the valve sleeve 14.

The valve slide piston 17 has a central section of small diameter, such that an annular space is formed axially between the ends of the valve slide piston 17 inside the valve sleeve 14. The annular space is connected to the radial bores 16. At a lower end in the valve sleeve 14, an annular edge 20 is formed. The annular edge 20, in the lower end position of the valve slide piston 17 illustrated, is separated from an annular edge 21, formed on the valve slide piston 17, by a narrow annular gap. The annular gap merges in a downward direction into an annular space connected to the low-pressure connection T inside the valve sleeve 14. An axial bore 22 is arranged in the valve sleeve 14 to connect this annular space to the low-pressure connection T.

In the normal position illustrated in FIG. 2, the radial bores 7 of the valve cartridge 1, connected to the motor connection P1 or P2, are connected to the low-pressure connection T via the radial bores 16, the annular gap between the annular edges 20 and 21 and the axial bore 22.

By contrast, the radial bores 7 are separated from the radial bores 6 which are connected to the pressure connection P because the conical section 10 of the valve sleeve 14 is seated on the annular edge 4 of the valve cartridge 1. If the valve slide piston 17 is now raised at its ram-like lower end counter to the force of the helical compression spring 19, the annular gap between the annular edges 20 and 21 is closed. This has the consequence that the motor connection P1 or P2 is shut-off relative to the low-pressure connection T. If the valve slide piston 17 is raised further, it strikes against the stop ring 18, such that, during a further upward stroke of the valve slide piston 17, the valve sleeve 14 is carried along with it. In this case, the resistance of the helical compression spring 9 has to be additionally overcome. As soon as the conical section 10 is then lifted-off the annular edge 4, the motor connection P1 or P2 is connected to the pressure connection P.

Since an axial bore 13 with a throttle effect is again arranged in the valve slide piston 17, the exchange of hydraulic medium again takes place between the space receiving the helical compression springs 9 and 19 and the low-pressure connection T counter to a specific throttle resistance. This has a damping effect on the stroke movements of the valve sleeve 14 and the valve slide piston 17.

Figure 3:
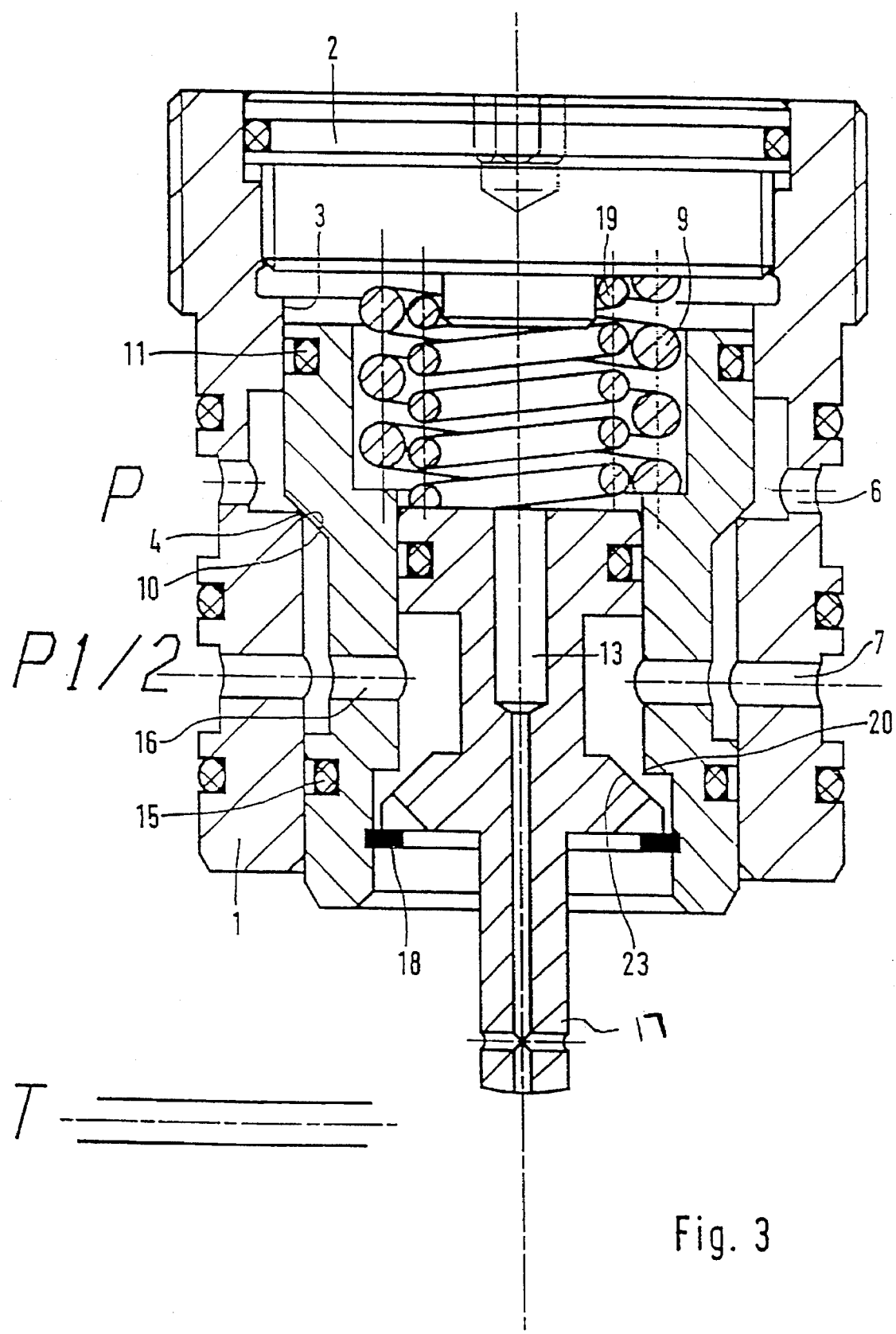
FIG. 3 is a cross-sectional view taken in an axial direction of a third embodiment of the servo valve according to the present invention.

The embodiment illustrated in FIG. 3 differs from the embodiment according to FIG. 2 in the fact that a cone 23 is arranged on the valve piston 17 instead of the annular edge 21. The cone interacts with the annular edge 20 of the valve sleeve 14 and, together with the stop ring 18 arranged at the lower end of the valve sleeve 14 in FIG. 3, bounds the axial mobility of the valve piston 17 in the valve sleeve 14.

The functioning greatly corresponds to the functioning of the embodiment according to FIG. 2. If the valve piston 17 is raised, the annular gap between the cone 23 and the annular edge 20 is closed, such that the motor connection P1 or P2 is separated from the low-pressure connection T. With a further upward movement of the valve piston 17, the valve sleeve 14 is carried along with it, thus causing the pressure connection P to be connected to the motor connection P1 or P2.

Figure 4:
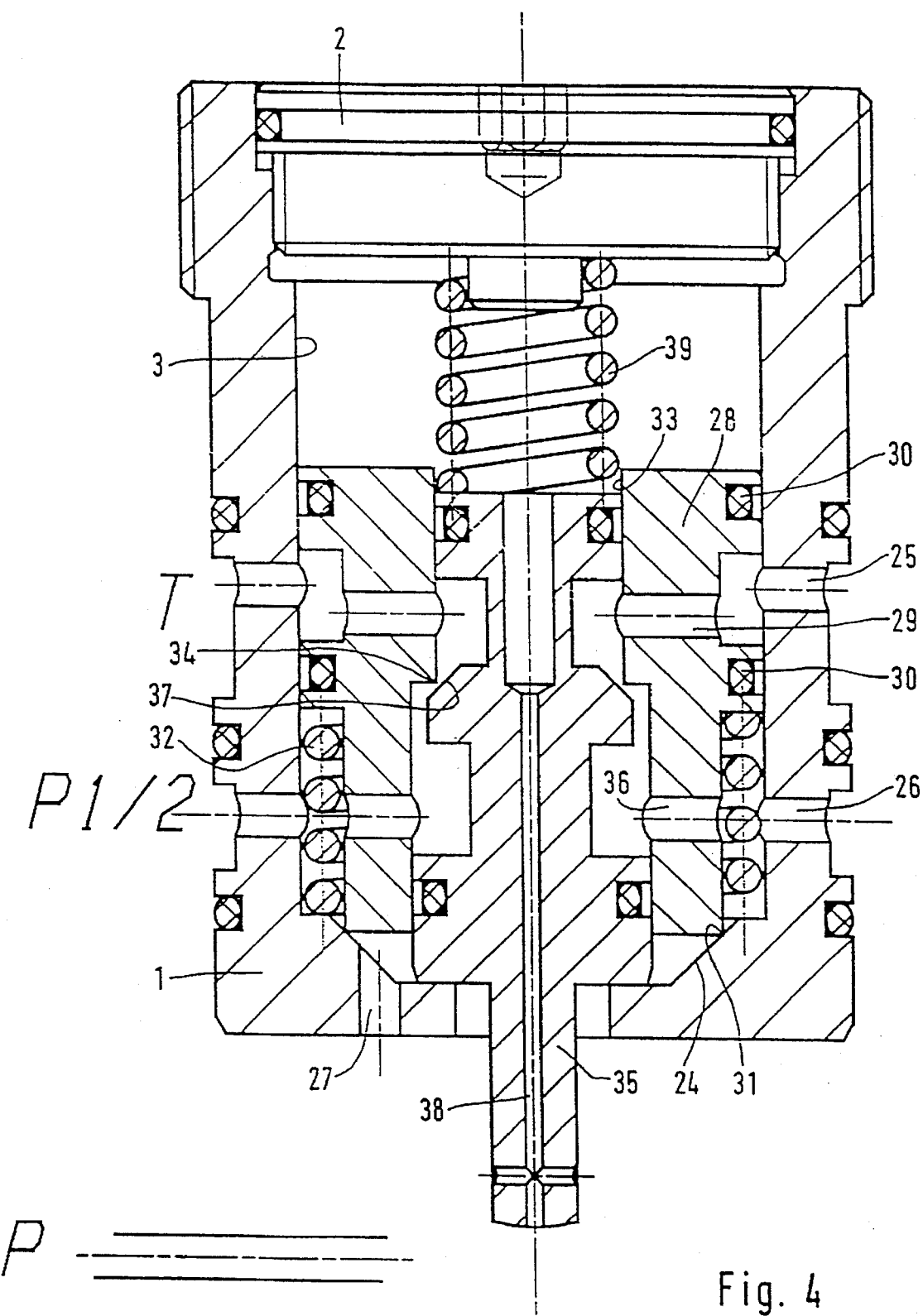
FIG. 4 is a cross-sectional view taken in an axial direction of a fourth embodiment of the servo valve according to the present invention.

In the embodiment illustrated in FIG. 4, the axial bore 3 of the valve cartridge is designed as a cylindrical bore which is continuous to a very great extent. One end of the bore 3 is closed by the base part 2, and the other end is adjoined by an inner cone 24.

With axial spacing from one another, radial bores 25 which lead to a low-pressure connection T and radial bores 26 are arranged on the valve cartridge 1. The radial bores 25 communicate with one of the motor connections P1 or P2. An axial opening 27 which communicates with the pressure connection P is disposed at the radially inner edge of the inner cone 24.

Accommodated with sliding displaceability inside the axial bore 3 is a valve sleeve 28 which has, in the region of the radial bores 25, a wide circumferential groove which communicates on the one hand with the radial bores 25 of the valve cartridge 1 and on the other hand with radial bores 29 of the valve sleeve 28. On both sides of the circumferential groove, there are sealing rings 30 on the valve sleeve 28. The sealing rings 30 seal-off the gap between the valve sleeve 28 and the axial bore 3 of the valve cartridge 1.

In the region of the radial bores 26 of the valve cartridge 1, the valve sleeve 28 has a reduced diameter in such a manner that an annular space is formed between the valve sleeve 28 and the wall of the axial bore 3 of the valve cartridge 1. The annular space extends up to the inner cone 24 of the valve cartridge 1. On the inner cone 24, the valve cartridge 1 is seated with an annular edge 31 in the lower end position illustrated in FIG. 4, such that the axial opening 27 is shut-off relative to the radial bores 26. Arranged in the above-mentioned annular space is a helical compression spring 32 which attempts to push the valve sleeve 28 upwards in FIG. 4. Radial bores 36 are otherwise arranged in the region of this annular space in the valve sleeve 28.

The axial inner bore 33 of the valve sleeve 28 as an upper section of a smaller diameter than a lower section of greater diameter. An annular step 34 is arranged between these sections.

A valve piston 35 is guided so as to be displaceable inside the inner bore 33. A piston-like upper end is sealed-off with a seal relative to the wall of the inner bore 33 in the upper section of the inner bore 33 above the radial bores 29. In a corresponding manner a lower, piston-like end of the valve piston 35 is sealed-off by a sealing ring in the lower section of the inner bore 33 below the radial bores 36 of the valve sleeve 28.

Between its piston-like ends, the valve piston 35 is designed with a small diameter in the region of the radial bores 29 and 36 of the valve sleeve 28 in such a way that annular spaces are formed in the region of the radial bores 29 and 36 inside the valve sleeve 28 on both sides of a valve cone part 37. The cone part 37 is formed on the valve piston 35. The valve cone part 37 interacts with the annular step 34 of the valve sleeve 28 between the radial bores 29 and 36. In this case, the valve cone part 37 is arranged on the valve piston 35 in such a way that a gap remains between the valve cone part 37 and the annular step 34 as long as both the valve piston 35 and the valve sleeve 28 are located in the lower end positions illustrated in FIG. 4.

The valve piston 35 is penetrated by an axial channel 38 which is throttled, if appropriate, such that the space above the valve sleeve 28 and the valve piston inside the valve cartridge 1 communicates with the pressure connection P.

The valve piston 35 is otherwise tensioned in the downward direction by a helical compression spring 39.

The pressure starting from the pressure connection P above the valve sleeve 28 causes the latter to try to sit with its annular edge 31 on the inner cone 24 counter to the force of the helical compression spring 32.

As long as the valve piston 35 then assumes its lower end position illustrated, the motor connection P1 or P2 and the low-pressure connection T are connected to one another via the radial bores 25 and 26 of the valve cartridge 1 and the radial bores 29 and 36 of the valve sleeve 28 as well as the annular gap between the valve cone part 37 and the annular step 34.

If the valve piston 35 is now raised counter to the force of its helical compression spring 39, the aforementioned annular gap is closed, i.e. the low pressure connection T is separated from the motor connection P1 or P2. If the valve piston 35 is now raised further, the annular edge 31 of the valve sleeve 28 is lifted-off the inner cone 24 of the valve cartridge 1, and the motor connection P1 or P2 is connected to the pressure connection P.

Since the pressure of the pressure connection P propagates via the radial bores 36 of the valve sleeve 28 right into the annular space inside the valve sleeve 28 below the valve cone part 37, the hydraulic compression forces acting on the valve sleeve 28 in the axial direction thereof are compensated. This has the consequence that the helical compression spring 32 can further raise the valve sleeve 28. As a result, the annular gap between the valve cone part 37 and the annular step 34 is again opened, such that the motor connection P1 or P2 is also temporarily connected to the low-pressure connection T. This occurs until the valve sleeve 28 is again forced in the downward direction against the raised valve piston 35 owing to the pressure drop in the region of the annular step 34 due to the hydraulic pressure in the space of the valve cartridge 1 receiving the helical spring 39. The annular gap between the valve cone part 37 and the annular step 34 is then again closed.

In this way, a pressure lying between the pressure of the pressure connection P and the (diminishing) pressure of the low-pressure connection T can be set at the motor connection P1 or P2 depending on the stroke of the valve piston 35 by means of subsequent strokes of the valve cartridge 1.

As soon as the valve piston 35 has again been brought into the lower end position illustrated in FIG. 4, the valve sleeve 28 is also displaced into the lower end position.

Figure 5:
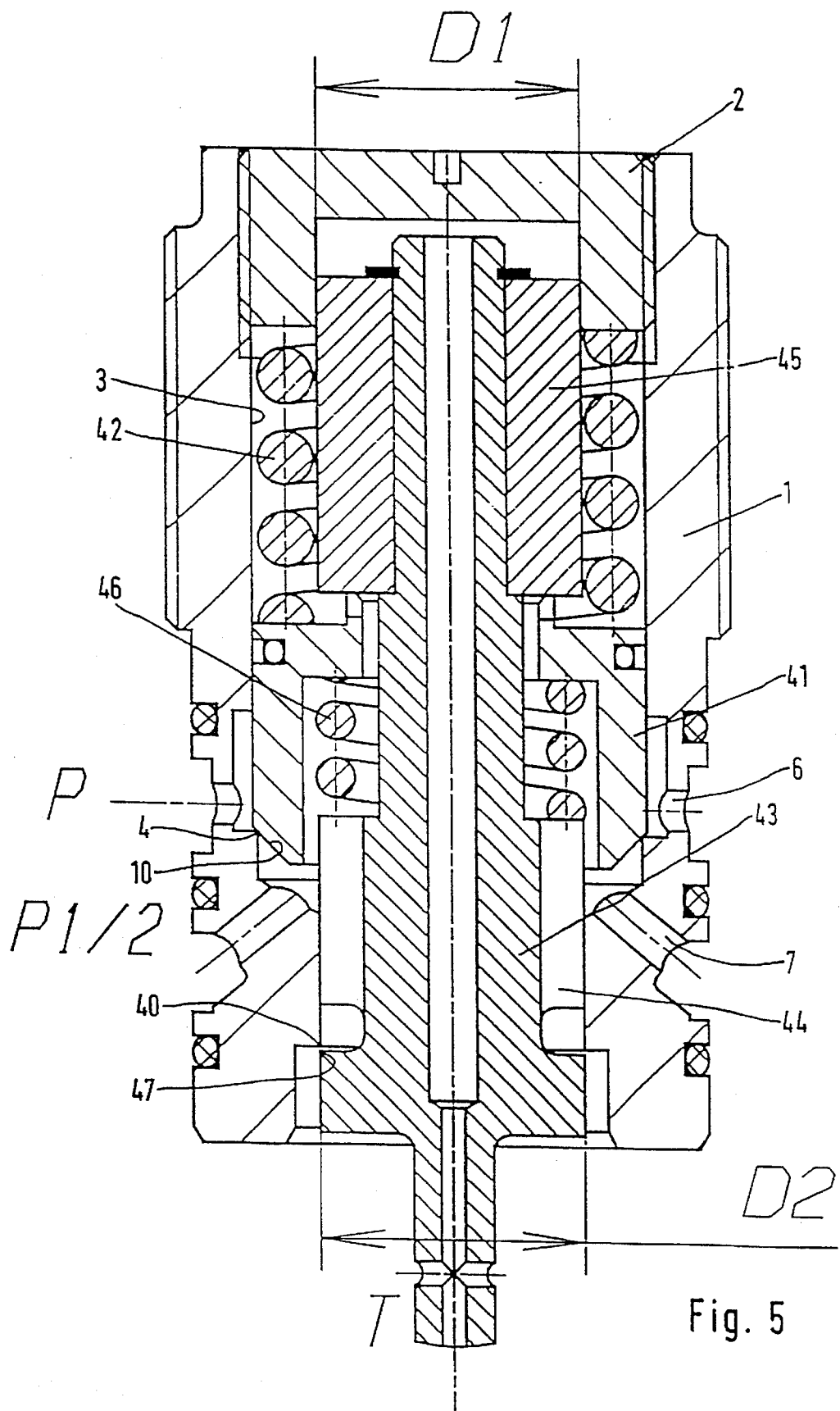
FIG. 5 is a cross-sectional view taken in an axial direction of a fifth embodiment of the servo valve according to the present invention.

In the embodiment according to FIG. 5, the base part 2 is arranged at the upper end of the axial bore 3 of the valve cartridge 1 so as to be axially adjustable by screwing in the manner of a setting screw. The axial bore 3 communicates with a pressure connection P via radial bores 6 of the valve cartridge 1 and with the motor connection P1 or P2 via the further bores 7 arranged radially obliquely. The lower open end of the radial bore 3 communicates with the low-pressure connection T.

Formed in the region of the radial bores 6 on the wall of the axial bore 3 is a wide inner circumferential groove. The groove is bounded at the bottom by the annular edge 4 whose diameter is smaller than the diameter of the axial bore 3 located above the annular groove. The annular edge 4 is located axially above the obliquely radial bores 7.

Axially below the bores 7, the axial bore 3 widens in the manner of a step at an annular edge 40.

A valve sleeve 41 is arranged with sliding displaceability in the axial bore 3 in the region axially above the annular edge 4. The valve sleeve 41 is forced in the downward direction by a helical compression spring 42, supported on the base part 2, in such a manner that the conical section 10 arranged at the lower end face of the valve sleeve 41 is seated on the annular edge 4 of the axial bore 3.

A valve piston 43 is arranged inside the axial bore 3 or the valve sleeve 41. The valve piston 43 is guided by means of axial webs 44 arranged on it with sliding displaceability in the section of the axial bore 3 below the obliquely radial bores 7. The valve piston 43 is provided, on its axial end piece at the top in FIG. 5, with a sleeve 45 which is firmly connected to it and interacts with a cup-like recess in the base part 2 for the axial guiding of the valve piston 43. The sleeve 45 additionally serves as a stop which interacts with the valve sleeve 41 and bounds the lower axial end position of the valve piston 43. This lower end position is assumed when, on the one hand, the sleeve 45 bears against the valve sleeve 41 and the latter is seated with the cone section 10 on the annular edge 4.

A passage or free space always remains between the valve sleeve 41 and the sleeve 45 and the section of the valve piston 43 adjoining it at the bottom, such that the space receiving the helical compression spring 42 constantly communicates with the space inside the valve sleeve 41.

Arranged inside the valve sleeve 41 is a further helical compression spring 46 which is supported, on the one hand, on the axial webs 44 of the valve piston 43 and, on the other hand, on a collar on the inner circumference of the valve sleeve 41. The helical compression spring 46 attempts to push the valve sleeve 41 upwards relative to the valve piston 43 in FIG. 5.

A collar with an annular edge 47 is arranged axially below the webs 44 on the valve piston 43, such that this collar is able to interact with the annular edge 40 of the axial bore 3 in the manner of a slide valve. In the lower end position of the valve piston 43 illustrated, a narrow annular gap remains between the annular edges 40 and 47, such that the low-pressure connection T can communicate with the obliquely radial bores 7 and correspondingly with the motor connection P1 or P2.

Normally, the spring 42 holds the valve sleeve 41 and the spring 46 holds the valve piston 43 in the respectively illustrated lower end position. The motor connection P1 or P2 is thus shut-off relative to the pressure connection P, but connected to the low-pressure connection T. In this state, the pressure at the pressure connection P brings about only a virtually vanishing force which attempts to lift the valve sleeve 41 off the annular edge 4. This is based on the fact that the outside diameter of the valve sleeve 41 is only slightly larger than the diameter of the annular edge 4. The helical compression spring 42 can thus reliably keep the valve sleeve 41 in the closed position.

If the valve piston 43 is now moved in the upward direction, the annular edges 40 and 47 running one above the other block the connection between the motor connection P1 or P2 and the low-pressure connection T. As soon as the helical compression spring 46, whose tensioning force in the positions illustrated in FIG. 5 of the valve piston 43 and valve sleeve 41 is less than the tensioning force of the helical compression spring 42, is tensioned sufficiently in the course of the upward movement of the valve piston 43, the valve sleeve 41 is carried along with it in the upward direction. This thus causes the pressure connection P to be connected to the motor connection P1 or P2. The pressure of the pressure connection P otherwise propagates right into the space of the helical compression spring 42, such that the valve sleeve 41 is subjected to hardly any resulting hydraulic force in the axial direction.

In the example illustrated, it is assumed that the diameters D1 and D2 of the sleeve 45 and the annular edge 40 are of equal size, such that the hydraulic forces acting axially on the valve piston 43 are mutually compensated. The force/path characteristic of the valve piston 43 is correspondingly determined solely by the springs 42 and 46. However, it is basically also possible for the diameters D1 and D2 to be of different dimensions and, in particular, for D2 to be larger than D1. A hydraulic restoring force must thus also be overcome during a further upward stroke of the valve piston 43 when the valve sleeve 41 has been lifted-off the annular edge 4.

The stroke path to be travelled by the valve piston 43, which is necessary in order to lift the valve sleeve 41 off the annular edge 4, is determined by the axial setting of the base part 2.

As soon as the valve piston 43 is again moved in the downward direction and the annular gap between the annular edges 40 and 47 is again opened, the valve sleeve 41 also again reaches the lower end position illustrated.

Figure 6:
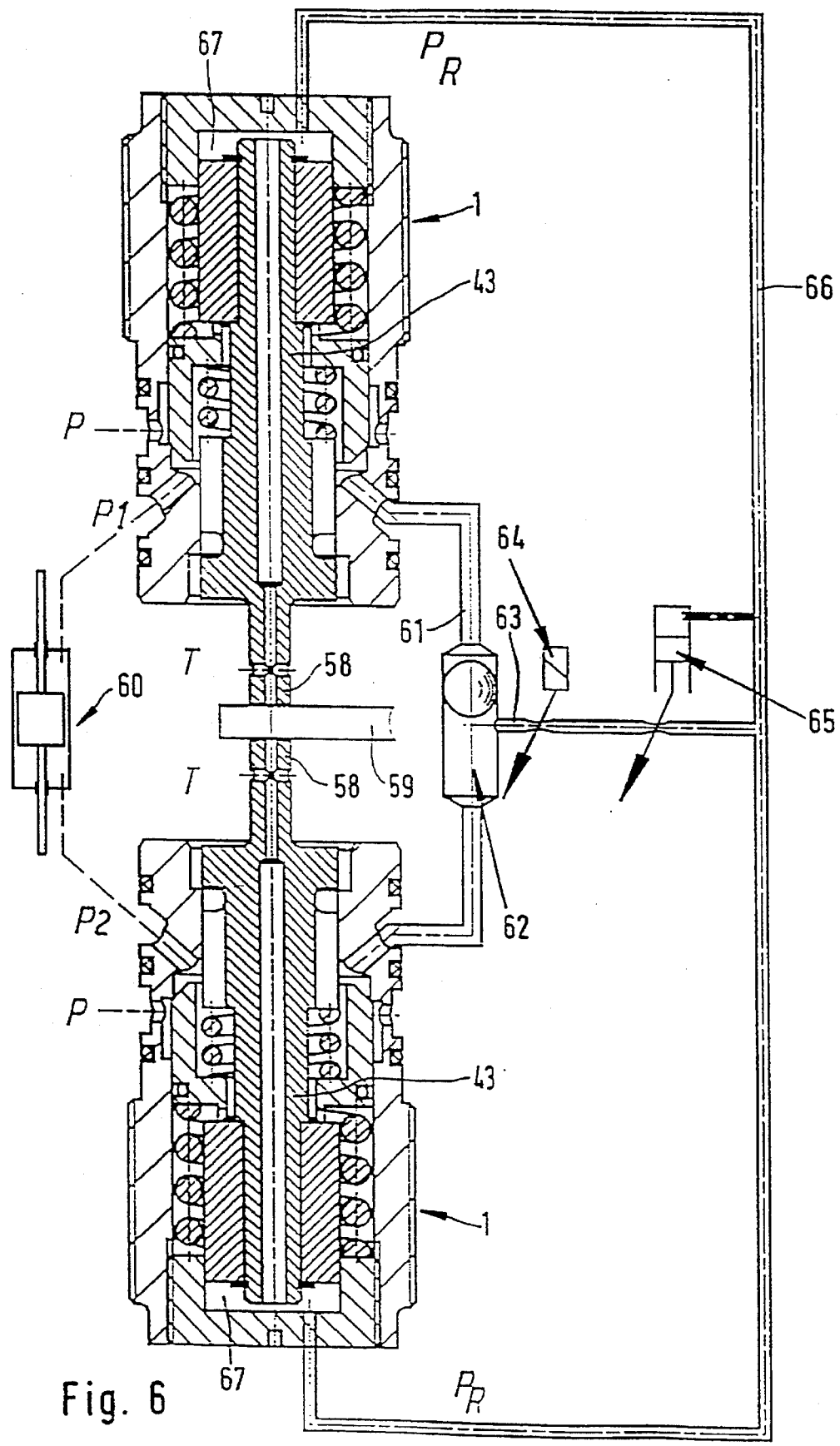
FIG. 6 illustrates an arrangement with a hydraulic reaction control.

FIG. 6 first shows, by way of example, how the valve cartridges 1 according to the present invention can be arranged in a power steering system of a motor vehicle. A finger 59 is arranged between the ram-like actuating members 58 of two valve cartridges 1 which are arranged equiaxially with respect to one another. The finger 59 can be displaced in the axial direction of the valve cartridges 1 and is mechanically coupled to the vehicle steering system in such a way that it executes a displacement in one direction or the other depending on the direction and magnitude of the actuating moment to be applied at the steering wheel. As long as no actuating moment is required, i.e. the vehicle steering system remains in the respective position without effort, the finger 59 assumes a central position in which both actuating members 58 of the two valve cartridges 1 have their end position, the end position being one advanced in the direction of the finger 59. Correspondingly, the motor connections P1 and P2 are hydraulically connected to the low-pressure connection T.

As soon as the finger 59 is displaced out of the central position illustrated, one valve cartridge 1 is actuated in each case, with the consequence that the associated motor connection P1 or P2 is caused to be hydraulically connected to the respective pressure connection P. Correspondingly, one side of the servomotor 60 is then acted upon with increased pressure. The servomotor 60 then generates a servo force which assists the respective steering maneuver by the driver.

The arrangement explained here is possible for all the valve cartridges illustrated.

Furthermore, FIG. 6 shows an example of how a hydraulic reaction control can be implemented—in particular together with the valve cartridges illustrated in FIG. 5.

Arranged between the motor connections P1 and P2 is a line 61 with a shuttle valve 62. The shuttle valve 62 prevents a direct connection between the motor connections P1 and P2, but connects the motor connection P1 or P2 with the respectively higher pressure to a connection 63. This connection 63 can be connected via a proportional valve 64 and a cutoff valve 65 arranged in series therewith to a pressure line 66 which, in turn, connects the chambers 67 remaining between the base parts 2 and the facing end faces of the valve pistons 43 of the valve cartridges 1. The chambers, in turn, are connected to the low pressure connection T via throttled axial bores in the valve pistons 43.

The proportional valve 64 can be controlled, for example, in dependence on the travelling speed. The cutoff valve 65 closes at a predetermined pressure in the pressure line 66.

In this manner, a control pressure $P_R$ can be generated in the pressure line 66. The control pressure $P_R$, on the one hand, is dependent on the respectively higher pressure at the motor connections P1 and P2 and, on the other hand, can additionally be influenced by a predeterminable parameter, such as, for example, the travelling speed. This control pressure PR generates, at the valve cartridge 1 actuated in each case by the finger 59, a force which counteracts the actuation, such that an actuation resistance occurs in the vehicle steering system. The actuation resistance varies analogously to the servo force generated by the servomotor 60.

Figure 7:
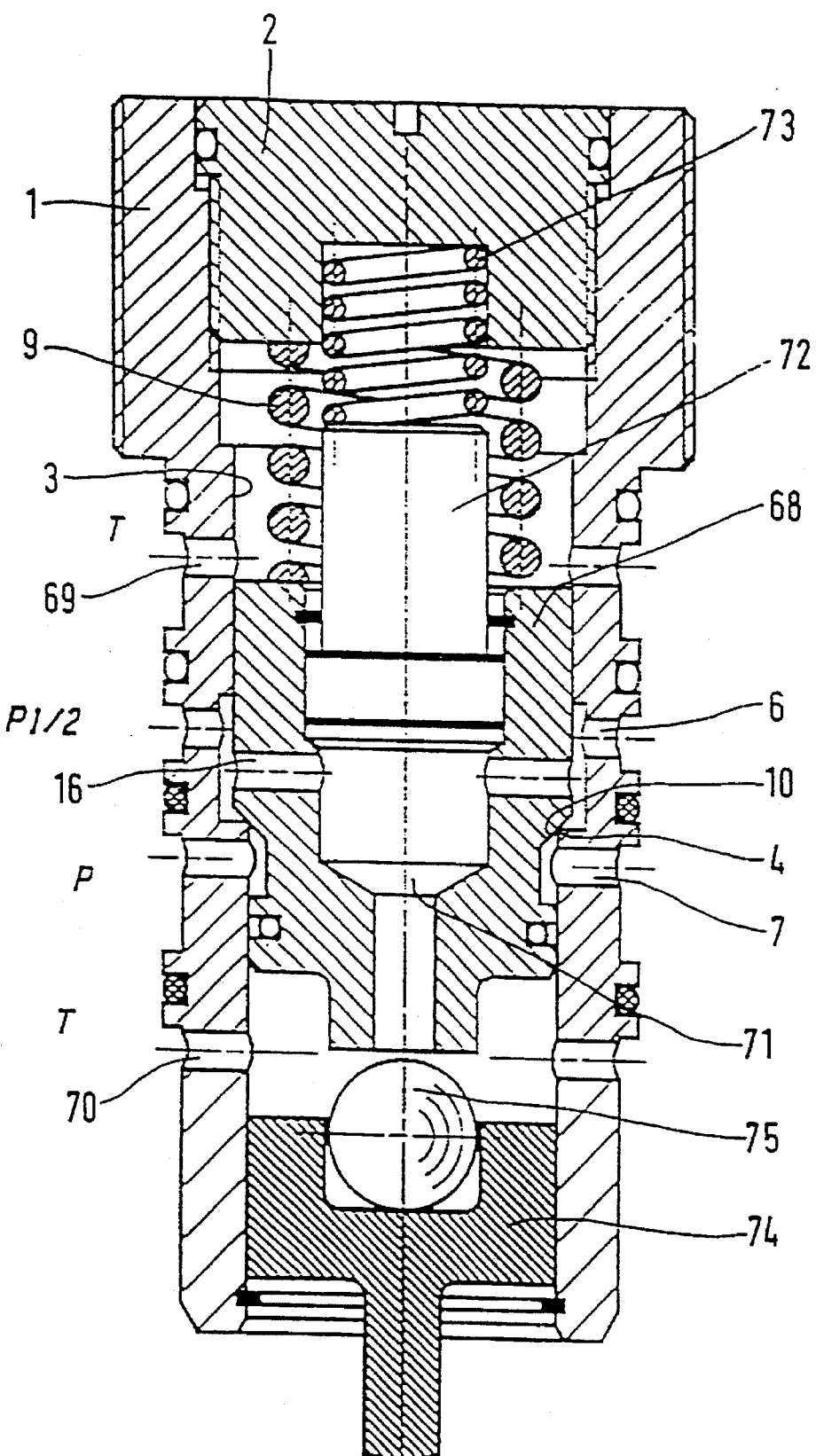
FIG. 7 illustrates a particularly preferred embodiment in which the maximum actuating force is limited in a predeterminable manner.

The particularly preferred embodiment of the invention illustrated in FIG. 7 has a valve sleeve 68 which is guided 80 as to be displaceable inside the axial bore 3 of the valve cartridge 1. The valve sleeve 68 is seated in the normal position, in a similar manner to the valve sleeve of FIG. 2, with a cone section 10 on the annular edge 4 of the axial bore 3. A helical compression spring 9 attempts to keep the valve sleeve 68 in this position. In this way, the radial bores 6 of the valve cartridge 1 leading to the motor connection P1 or P2 are normally hydraulically separated from the radial bores 7 connected to the pressure connection P. Arranged on the valve cartridge 1 axially above and below the valve sleeve 68 are radial bores 69 and 70 which are connected to the low-pressure connection T.

The valve sleeve 68 otherwise again has radial bores 16 which communicate with the radial bores 6 of the motor connection P1 or P2 in all positions of the valve sleeve 68.

A piston 72 is arranged 80 as to be axially displaceable to a limited extent above the radial bores 16 in the stepped axial bore 71 of the valve sleeve 68. The upward stroke of the piston 72 is bounded relative to the valve sleeve 68 by a stop ring arranged in the axial bore 71. The downward stroke is bounded by an annular step in the axial bore 71. This piston 72 is forced in the downward direction by a helical compression spring 73 supported on the base part 2 of the valve cartridge 1, such that it constantly attempts to assume its lower end position in the valve sleeve 68.

Arranged displaceably in the axial bore 3 of the valve cartridge 1 below the valve sleeve 68 is a ram 74. The ram 74 bears a, for example, spherical closure part 75 which interacts with the facing end opening of the axial bore 71 of the valve sleeve 68.

The ram 74 normally assumes the lower end position illustrated, in which the closure part 75 is remote from the facing end opening of the axial bore 71 of the valve sleeve 68, and the section of the axial bore 71 below the piston 72 communicates with the radial bores 70 and thus with the low-pressure connection T. At the same time, the valve sleeve 68 assumes the lower end position illustrated. Correspondingly, the motor connection P1 or P2 is, on the one hand, shut-off relative to the pressure connection P and, on the other hand, connected—via the axial bore 71 of the valve sleeve 68—to the low-pressure connection T. Since there is no pressure or only little pressure inside the axial bore 71 below the piston 72, the piston 72 also assumes its lower end position inside the valve sleeve 68.

As soon as the ram 74 is now moved to a sufficient extent in the upward direction, the closure part 75 closes the axial bore 71 of the valve sleeve 68 at the bottom. As a result, the motor connection P1 or P2 is separated from the low-pressure connection T. In the case of further upward displacement of the ram 74, the cone section 10 of the valve sleeve 68 is lifted off the annular edge 4 of the valve cartridge 1, and the motor connection P1 or P2 is connected to the pressure connection P. The hydraulic pressure prevailing at the motor connection P1 or P2 also acts on the piston 72, such that the latter is forced hydraulically in the direction of its upper end position inside the valve sleeve 68 counter to the force of the helical compression spring 73. As long as this end position has not yet been reached, a further upward movement of the ram 74 is opposed by a hydraulically generated resistance whose magnitude depends on the pressure at the motor connection P1 or P2 and on the effective cross-section of the piston 72. This is because the pressure acting upon the piston 72 also acts in the downward direction on the valve sleeve 68 and the closure part 75. This hydraulically generated resistance varies analogously to the pressure at the motor connection P1 or P2.

As soon as the pressure at the motor connection P1 or P2 is sufficient to bring the piston 62 into the upper end position inside the valve sleeve 68, the hydraulically generated resistance counteracting a further upward displacement of the ram 74 can virtually no longer rise, i.e. during a further upward displacement of the ram 74, only the increasing spring tensions of the helical compression springs 9 and 73 have to be taken into account. In practice, this means that the maximum force for actuating the ram 74 is limited.

The servo valves described are not only suitable for power steering systems of motor vehicles. It is also possible, for example, to control the pressure in a (single-action) displacer or piston/cylinder assembly using one of the servo valves described, such that a (comparatively high) setting force is generated analogously to the actuating force of the displacer or piston/cylinder assembly acting on the servo valve. In this case, the servo valve and the displacer or piston/cylinder assembly can be combined to form a so-called linear booster.

The braking force of a vehicle brake can otherwise also be controlled using the servo valves according to the present invention if the brake is designed as a pressure accumulator brake, in which the pressure of a pressure accumulator is fed under control to an actuating assembly of the brake designed as a displacer assembly.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A servo valve arrangement having a high-pressure connection, a low-pressure connection, and a motor connection, the servo valve arrangement comprising:

a pressure control valve arranged between the high-pressure connection and the motor connection;

a return control valve arranged between the motor connection and the low-pressure connection;

wherein said pressure control valve is normally closed and said return control valve is normally open, both said pressure control and said return control valves including axially displaceable control parts arranged equiaxially with respect to one another;

an actuating member common to both said pressure control and said return control valves, said actuating member actuating the axially displaceably control parts while closing said return control valve and opening said pressure control valve;

wherein said pressure control valve is a seat valve;

wherein said axially displaceably control parts are arranged as parts of a common valve piston; and wherein said return control valve is a slide valve having first and second control edges interacting with each other.

2. A servo valve arrangement according to claim 1, further comprising means for normally throttling the return control valve.

3. A servo valve arrangement according to claim 1, further comprising means for resiliently coupling said control part of said pressure control valve to said control part of said return control valve.

4. A servo valve arrangement according to claim 2, further comprising means for resiliently coupling said control part of said pressure control valve is resiliently coupled to said control part of said return control valve.

5. A servo valve arrangement according to claim 1, wherein said common actuating member is a ram.

6. A servo valve arrangement having a high-pressure connection, a low-pressure connection, and a motor connection, the servo valve arrangement comprising:

a pressure control valve arranged between the high-pressure connection and the motor connection;

a return control valve arranged between the motor connection and the low-pressure connection;

wherein said pressure control valve is normally closed and said return control valve is normally open, both said pressure control and said return control valves including axially displaceable control parts arranged equiaxially with respect to one another;

an actuating member common to both said pressure control and said return control valves, said actuating member actuating the axially displaceably control parts while closing said return control valve and opening said pressure control valve;

wherein said pressure control valve is a seat valve; and wherein said control part of said return control valve is displaceable to a limited extent relative to a control part of said pressure control valve, said control part of the return control valve being drivingly coupled to said control part of said pressure control valve and having means for only opening said pressure control valve after said return control valve closes.

7. A servo valve arrangement according to claim 6, further comprising means for resiliently coupling said control part of said pressure control valve is resiliently coupled to said control part of said return control valve.

8. A servo valve arrangement according to claim 6, wherein said return control valve is a slide valve having first and second control edges interacting with each other.

9. A servo valve arrangement according to claim 6, wherein said return control valve is a seat valve.

10. A servo valve arrangement having a high-pressure connection, a low-pressure connection, and a motor connection, the servo valve arrangement comprising:

a pressure control valve arranged between the high-pressure connection and the motor connection;

a return control valve arranged between the motor connection and the low-pressure connection;

wherein said pressure control valve is normally closed and said return control valve is normally open, both said pressure control and said return control valves including axially displaceable control parts arranged equiaxially with respect to one another;

an actuating member common to both said pressure control and said return control valves, said actuating member actuating the axially displaceably control parts while closing said return control valve and opening said pressure control valve;

wherein said pressure control valve is a seat valve;

wherein said axially displaceably control parts are arranged as parts of a common valve piston; and wherein the control part of said return control valve is displaceable to a limited extent relative to the control part of said pressure control valve, said control part of the return control valve being drivingly coupled to said control part of said pressure control valve and having means for only opening said pressure control valve after said return control valve closes.

* * * * *